United States Patent
Wei et al.

(10) Patent No.: US 9,728,921 B2
(45) Date of Patent: Aug. 8, 2017

(54) TF CARD CONNECTOR WHICH IS CAPABLE OF INSTALLING NANO-SIM CARD AND MOBILE PHONE THEREOF

(71) Applicant: HUIZHOU TCL MOBILE COMMUNICATION CO., LTD, HuiZhou (CN)

(72) Inventors: Jinping Wei, HuiZhou (CN); Yanshun Guo, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/890,504

(22) PCT Filed: Feb. 9, 2015

(86) PCT No.: PCT/CN2015/072532
§ 371 (c)(1),
(2) Date: Nov. 11, 2015

(87) PCT Pub. No.: WO2016/011807
PCT Pub. Date: Jan. 28, 2016

(65) Prior Publication Data
US 2017/0125932 A1    May 4, 2017

(30) Foreign Application Priority Data
Jul. 24, 2014 (CN) ............ 2014 1 0354980

(51) Int. Cl.
*H01R 27/00* (2006.01)
*H01R 12/73* (2011.01)
(Continued)

(52) U.S. Cl.
CPC ............ *H01R 27/00* (2013.01); *G06K 13/08* (2013.01); *G06K 13/0812* (2013.01);
(Continued)

(58) Field of Classification Search
CPC ........................... G06K 13/0812; H01R 27/00
See application file for complete search history.

(56) References Cited

U.S. PATENT DOCUMENTS

| 9,318,830 B2 * | 4/2016 | Choi | ............... H01R 13/193 |
| 2006/0166559 A1 * | 7/2006 | Nakai | .................. G06K 19/077 439/630 |

(Continued)

FOREIGN PATENT DOCUMENTS

| CN | 201594678 | 9/2010 |
| CN | 202977848 | 6/2013 |

(Continued)

*Primary Examiner* — James Harvey
(74) *Attorney, Agent, or Firm* — Kirton McConkie; Evan R. Witt

(57) ABSTRACT

The invention discloses a TF card connector which is capable of installing a Nano-SIM card and a mobile phone thereof. The TF card connector is improved by arranging a Nano-SIM card connector in the TF card connector so that the functions are increased for the TF card connector. The mobile phone have the function of installing an SIM card by arranging the TF card connector capable of installing the Nano-SIM card in the mobile phone to increase the novel functions for the mobile phone such that the Nano-SIM card is used simply and conveniently after the Nano-SIM card is installed.

17 Claims, 4 Drawing Sheets

(51) Int. Cl.
*H01R 12/71* (2011.01)
*H01R 13/514* (2006.01)
*G06K 13/08* (2006.01)

(52) U.S. Cl.
CPC ........... *H01R 12/716* (2013.01); *H01R 12/73* (2013.01); *H01R 13/514* (2013.01); *G06K 13/0862* (2013.01)

(56) References Cited

U.S. PATENT DOCUMENTS

| | | | | |
|---|---|---|---|---|
| 2006/0216999 A1* | 9/2006 | Hsiao | .................. | H01R 13/641 439/630 |
| 2007/0224863 A1* | 9/2007 | Wang | .................. | G06K 7/0034 439/159 |
| 2008/0207060 A1* | 8/2008 | Kiryu | .................... | H01R 27/00 439/660 |
| 2009/0019224 A1* | 1/2009 | Pocrass | ................. | G06F 13/385 711/115 |
| 2013/0260612 A1* | 10/2013 | Sherry | ................. | G06K 7/0021 439/630 |
| 2013/0288535 A1 | 10/2013 | You et al. | | |
| 2014/0099805 A1* | 4/2014 | Kutchery | ............ | H04B 1/3816 439/76.1 |
| 2014/0113495 A1* | 4/2014 | Lim | ....................... | H01R 27/00 439/630 |
| 2014/0199875 A1* | 7/2014 | Choi | ..................... | H04B 1/3816 439/346 |
| 2015/0079847 A1* | 3/2015 | Liu | ...................... | H01R 12/721 439/630 |
| 2015/0270670 A1* | 9/2015 | Zhang | ................. | G06K 7/0073 439/631 |

FOREIGN PATENT DOCUMENTS

| | | |
|---|---|---|
| CN | 103378461 | 10/2013 |
| CN | 104124587 | 10/2014 |
| KR | 200473528 | 7/2014 |

\* cited by examiner

TF CARD CONNECTOR WHICH IS CAPABLE OF INSTALLING NANO-SIM CARD AND MOBILE PHONE THEREOF

BACKGROUND OF THE INVENTION

Field of Invention

The present invention relates to a connector installed in the mobile phone, and more particularly to a TF card connector which is capable of installing a Nano-SIM card and a mobile phone thereof.

Description of Prior Art

Currently, almost all mobile phones can be installed with memory cards and a widely-used memory card is the TF card. However, conventionally, the TF card connector within the mobile phone is only for inserting TF card therein, which is too simple.

Consequently, there is a need to solve the above problem and develop a new technique.

SUMMARY OF THE INVENTION

Based on the aforementioned problems, one objective of the present invention is to provide a TF card and the Nano-SIM card in the TF card connector which is capable of installing a Nano-SIM card and a mobile phone thereof for increasing the functions of the TF card connector to allow the TF card connector to be installed by TF card and Nano-SIM card.

For the above-mentioned objective, the present invention employs the following technical scheme.

A TF card connector which is capable of installing a Nano-SIM card, comprises a terminal retaining base, a first card slot disposed on the terminal retaining base and adapted to a TF card, and a plurality of first conducting terminals disposed on the terminal retaining base wherein a plurality of first ends of the first conducting terminals are disposed in the first card slot for connecting to the TF card and a plurality of second ends of the first conducting terminals are disposed in one side of the terminal retaining base for connecting to a main board of the mobile phone, wherein the TF card connector further comprises:

a second card slot disposed on the terminal retaining base and adapted to a Nano-SIM card, and a plurality of second conducting terminals disposed on the terminal retaining base wherein a plurality of first ends of the second conducting terminals are disposed in the second card slot for connecting to the Nano-SIM card and a plurality of second ends of the second conducting terminals are disposed in one side of the terminal retaining base for connecting to the main board of the mobile phone;

a pushing structure disposed on the terminal retaining base; and a plurality of embossment structures disposed on the terminal retaining base.

The TF card connector which is capable of installing the Nano-SIM card further comprises the Nano-SIM card identification switch disposed on the terminal retaining base for closing the Nano-SIM card identification switch when the Nano-SIM card is inserted.

The TF card connector which is capable of installing the Nano-SIM card further comprises a TF card identification switch disposed on the terminal retaining base for closing the TF card identification switch when the TF card is inserted.

In the TF card connector which is capable of installing the Nano-SIM card, the second ends of the first conducting terminals and the second ends of the second conducting terminals are disposed respectively in the same side of the terminal retaining base.

In the TF card connector which is capable of installing the Nano-SIM card, the second ends of the first conducting terminals and the second ends of the second conducting terminals are disposed respectively in the different sides of the terminal retaining base.

In the TF card connector which is capable of installing the Nano-SIM card, the second card slot is opened and disposed on a bottom surface of the first card slot.

In the TF card connector which is capable of installing the Nano-SIM card, two sides of the second card slot and the first card slot are overlapped and eight second conducting terminals are disposed on the TF card connector which is capable of installing the Nano-SIM card.

For the above-mentioned objective, the present invention employs the following technical scheme.

A TF card connector which is capable of installing a Nano-SIM card, comprises a terminal retaining base, a first card slot disposed on the terminal retaining base and adapted to a TF card, and a plurality of first conducting terminals disposed on the terminal retaining base wherein a plurality of first ends of the first conducting terminals are disposed in the first card slot for connecting to the TF card and a plurality of second ends of the first conducting terminals are disposed in one side of the terminal retaining base for connecting to a main board of the mobile phone, wherein the TF card connector further comprises:

a second card slot disposed on the terminal retaining base and adapted to a Nano-SIM card, and a plurality of second conducting terminals disposed on the terminal retaining base wherein a plurality of first ends of the second conducting terminals are disposed in the second card slot for connecting to the Nano-SIM card and a plurality of second ends of the second conducting terminals are disposed in one side of the terminal retaining base for connecting to the main board of the mobile phone.

The TF card connector which is capable of installing the Nano-SIM card further comprises the Nano-SIM card identification switch disposed on the terminal retaining base for closing the Nano-SIM card identification switch when the Nano-SIM card is inserted.

The TF card connector which is capable of installing the Nano-SIM card further comprises a TF card identification switch disposed on the terminal retaining base for closing the TF card identification switch when the TF card is inserted.

The TF card connector which is capable of installing the Nano-SIM card further comprises a pushing structure disposed on the terminal retaining base.

In the TF card connector which is capable of installing the Nano-SIM card, the second ends of the first conducting terminals and the second ends of the second conducting terminals are disposed respectively in the same side of the terminal retaining base.

In the TF card connector which is capable of installing the Nano-SIM card, the second ends of the first conducting terminals and the second ends of the second conducting terminals are disposed respectively in the different sides of the terminal retaining base.

In the TF card connector which is capable of installing the Nano-SIM card, the second card slot is opened and disposed on a bottom surface of the first card slot.

In the TF card connector which is capable of installing the Nano-SIM card, two sides of the second card slot and the first card slot are overlapped and eight second conducting terminals are disposed on the TF card connector which is capable of installing the Nano-SIM card.

The TF card connector which is capable of installing the Nano-SIM card further comprises a plurality of embossment structures disposed on the terminal retaining base.

A mobile phone comprises the TF card connector which is capable of installing the Nano-SIM card described in the above-mentioned descriptions.

The invention discloses a TF card connector which is capable of installing a Nano-SIM card and a mobile phone thereof. The TF card connector is improved by arranging a Nano-SIM card connector in the TF card connector so that the functions are increased for the TF card connector. The mobile phone have the function of installing an SIM card by arranging the TF card connector capable of installing the Nano-SIM card in the mobile phone to increase the novel functions for the mobile phone such that the Nano-SIM card is used simply and conveniently after the Nano-SIM card is installed.

DETAILED DESCRIPTION OF THE PREFERRED EMBODIMENTS

The present invention provides a TF card connector which is capable of installing a Nano-SIM card and a mobile phone thereof. The foregoing aspects and many of the attendant advantages of this invention will become more readily appreciated as the same becomes better understood by reference to the following detailed description, when taken in conjunction with the accompanying drawings. It should be noted that the described embodiments are merely used to explain the present invention rather than limiting of the present invention.

Figure 1:
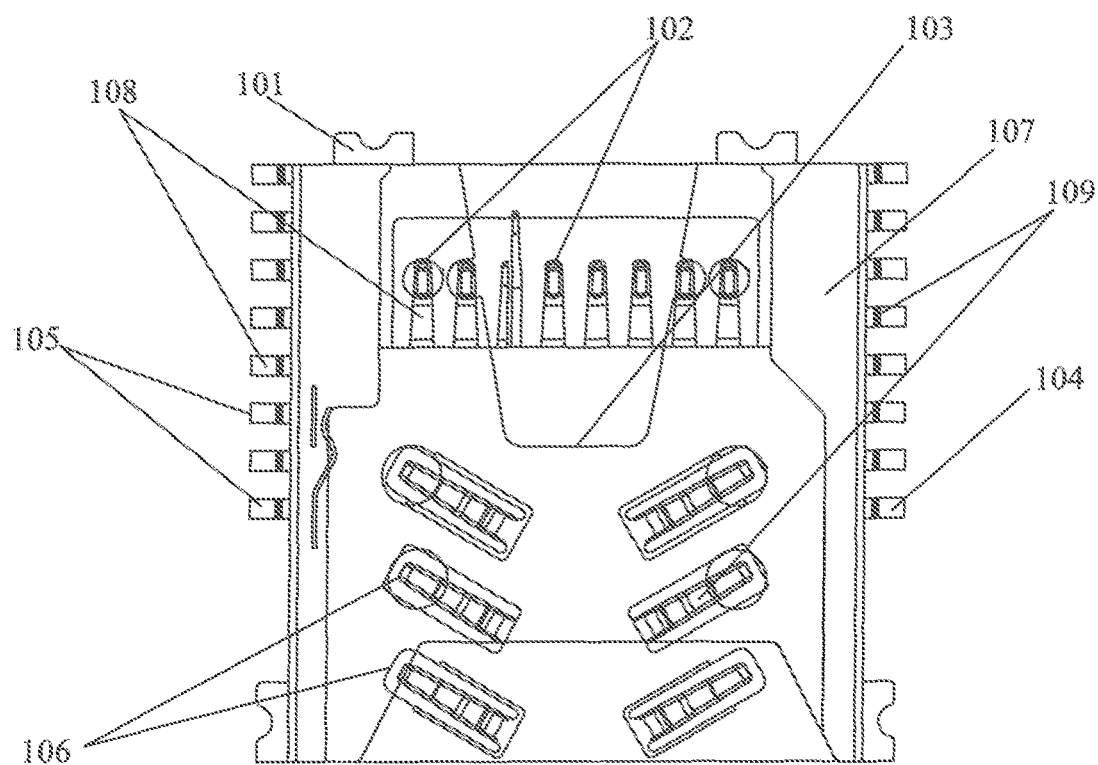
FIG. 1 is a schematic structural view of a TF card connector which is capable of installing a Nano-SIM card according to one embodiment of the present invention.

Refer to FIG. 1, which is a schematic structural view of a TF card connector which is capable of installing a Nano-SIM card according to one embodiment of the present invention. As shown in FIG. 1, the TF card connector which is capable of installing a Nano-SIM card comprises a terminal retaining base 107, a first card slot (shown in FIG. 2) disposed on the terminal retaining base 107 and adapted to a TF card, and a plurality of first conducting terminals 108 disposed on the terminal retaining base 107 wherein a plurality of first ends 102 of the first conducting terminals 108 are disposed in the first card slot for connecting to the TF card and a plurality of second ends 105 of the first conducting terminals 108 are disposed in one side of the terminal retaining base 107 for connecting to a main board of the mobile phone.

A second card slot (shown in FIG. 3) is disposed on the terminal retaining base 107 and adapted to a Nano-SIM card, and a plurality of second conducting terminals 109 disposed on the terminal retaining base 107 wherein a plurality of first ends 106 of the second conducting terminals 109 are disposed in the second card slot for connecting to the Nano-SIM card and a plurality of second ends 104 of the second conducting terminals 109 are disposed in one side of the terminal retaining base 107 for connecting to a main board of the mobile phone.

As the aforementioned TF card connector which is capable of installing a Nano-SIM card, the TF card connector is improved by arranging a Nano-SIM card connector in the TF card connector so that the functions are increased for the TF card connector.

Figure 2:
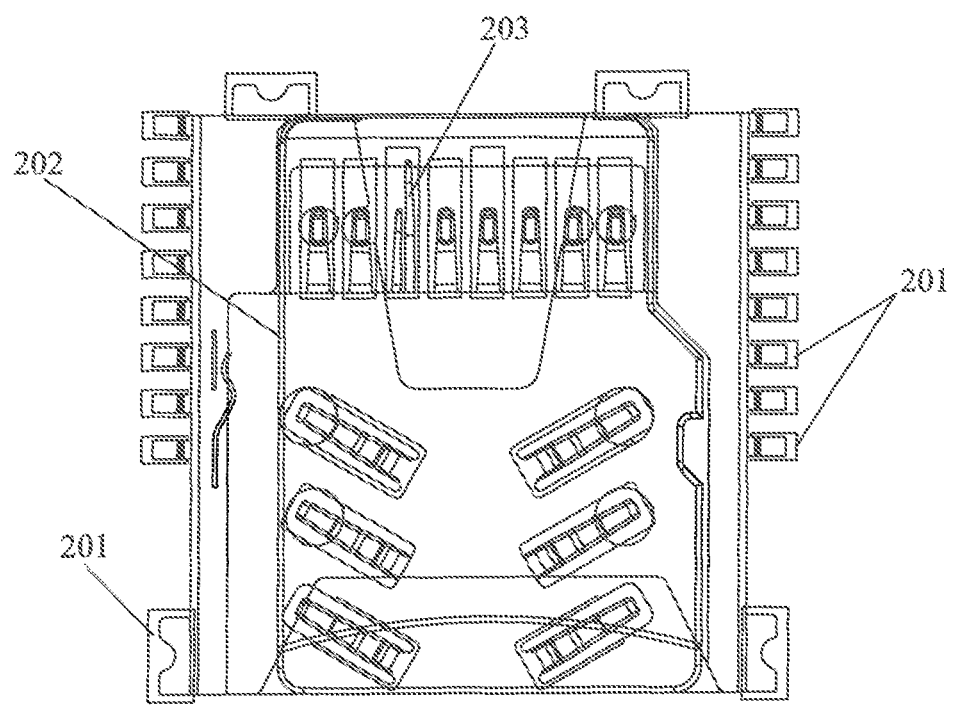
FIG. 2 is a schematic assembly view of assembling a TF card in the TF card connector which is capable of installing a Nano-SIM card according to one embodiment of the present invention.

Refer to FIG. 2, which is a schematic assembly view of assembling a TF card in the TF card connector which is capable of installing a Nano-SIM card according to one embodiment of the present invention. As shown in FIG. 2, the TF card connector which is capable of installing a Nano-SIM card is disposed on the main board of the mobile phone. A plurality of embossment structures 101 (as shown in FIG. 1) are disposed on the terminal retaining base 107 of the TF card connector which is capable of installing a Nano-SIM card. The embossment structures 101, the second ends of the first conducting terminals 108 and second ends of the second conducting terminals 109 are connected to the main board of the mobile phone by way of the plastic body 201. After the TF card 202 is arranged in the TF card connector which is capable of installing a Nano-SIM card, the TF card triggers the TF card identification switch 203 disposed on the terminal retaining base 107 for closing the TF card identification switch 203. After the TF card identification switch 203 is in the closed status, a circuit disposed in the mobile phone is switched on for generating an interrupted signal to allow the mobile phone to identify the TF card while the mobile phone receives the interrupted signal.

Continuously refer to FIG. 1. In order to conveniently extract the TF card from the TF card connector, a pushing structure is disposed on the TF card connector which is capable of installing a Nano-SIM card wherein the pushing structure is an empty slot arranged in the TF card connector which is capable of installing a Nano-SIM card such that the user is capable of contacting the TF card by way of the empty slot to eject the TF card.

Figure 3:
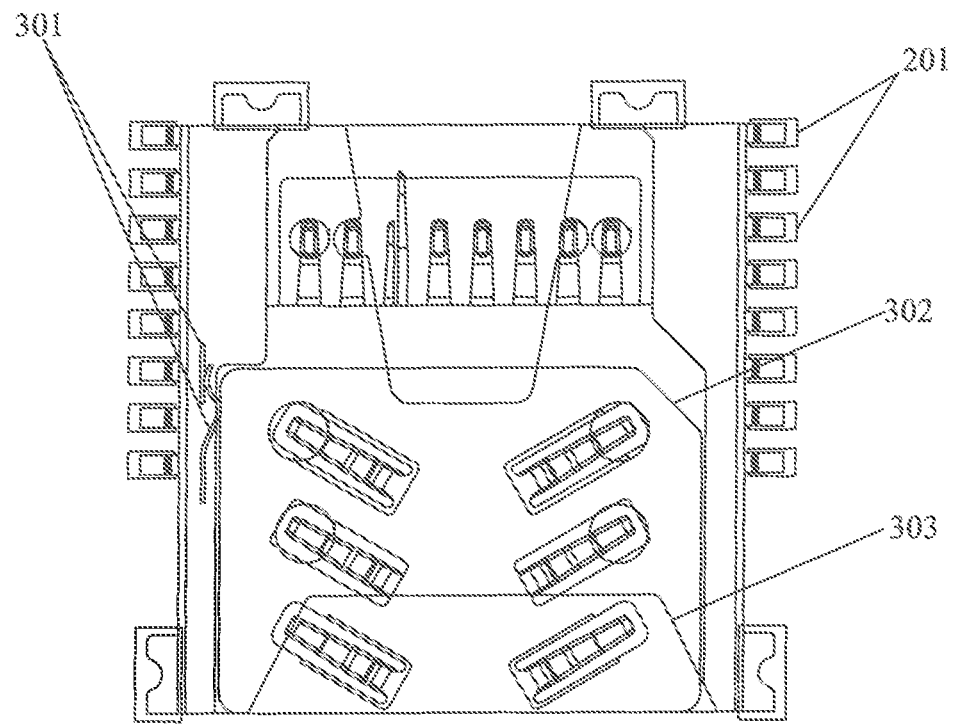
FIG. 3 is a schematic assembly view of assembling a Nano-SIM card in the TF card connector which is capable of installing a Nano-SIM card according to one embodiment of the present invention.

Refer to FIG. 3, which is a schematic assembly view of assembling a Nano-SIM card in the TF card connector which is capable of installing a Nano-SIM card according to one embodiment of the present invention. As shown in FIG. 3, after the Nano-SIM card 302 is arranged in the TF card connector which is capable of installing a Nano-SIM card, the Nano-SIM card triggers the Nano-SIM card identification switch 301 disposed on the terminal retaining base 107 for closing the Nano-SIM card identification switch 301. After the Nano-SIM card identification switch 301 is in the closed status, a circuit disposed in the mobile phone is switched on for generating an interrupted signal to allow the mobile phone to identify the Nano-SIM card while the mobile phone receives the interrupted signal. Similar to the above-mentioned pushing structure, an extracting structure 303 is disposed in the TF card connector to conveniently insert the Nano-SIM card into the TF card connector or extract the Nano-SIM card from the TF card connector.

Figure 4:
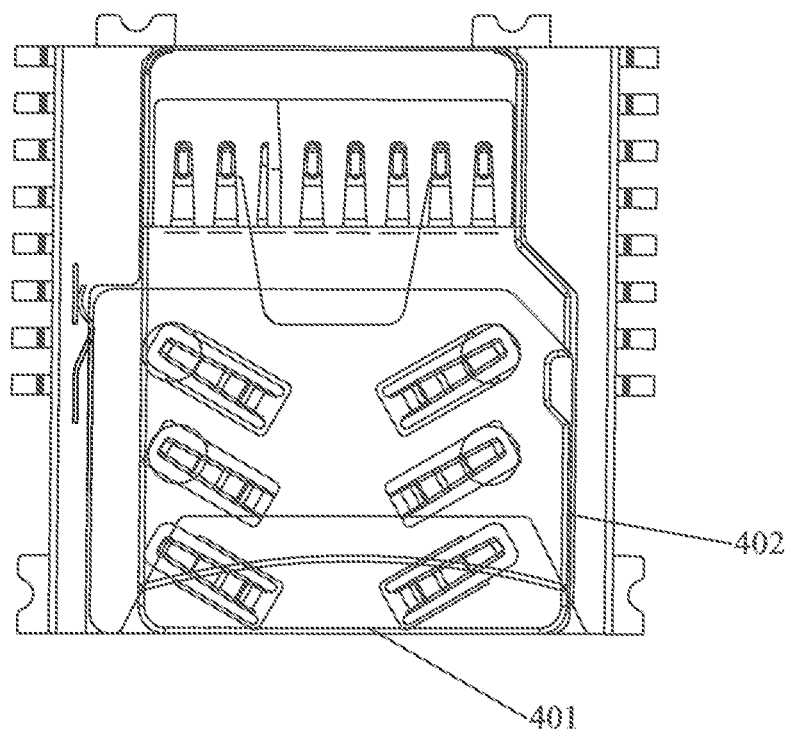
FIG. 4 is a schematic assembly view of assembling the TF card and the Nano-SIM card in the TF card connector which is capable of installing a Nano-SIM card according to one embodiment of the present invention.

Refer to FIG. 4, which is a schematic assembly view of assembling the TF card and the Nano-SIM card in the TF card connector which is capable of installing a Nano-SIM card according to one embodiment of the present invention. As shown in FIG. 4, the TF card and the Nano-SIM card are arranged in the TF card connector which is capable of installing a Nano-SIM card. The second card slot is opened and disposed on the bottom surface of the first card slot. The two sides 402, 401 of the second card slot and the first card slot are overlapped. This maintains the structure of TF card connector so that the Nano-SIM card connector is arranged in the TF card connector to save the space for the mobile phone.

In one preferred embodiment of the TF card connector which is capable of installing a Nano-SIM card, the second ends of the first conducting terminals and the second ends of the second conducting terminals are disposed respectively in the same side of the terminal retaining base. By arranging the second ends of the first conducting terminals and the second ends of the second conducting terminals in the same side of the terminal retaining base, the installation position of the TF card connector which is capable of installing a Nano-SIM card is configured without restriction in order to arrange the TF card connector which is capable of installing a Nano-SIM card in the main board's edge of the mobile phone.

In one preferred embodiment of the TF card connector which is capable of installing a Nano-SIM card, the second ends of the first conducting terminals and the second ends of the second conducting terminals are disposed respectively in the different sides of the terminal retaining base. By arranging the second ends of the first conducting terminals and the second ends of the second conducting terminals in the different sides of the terminal retaining base, the connection strength between TF card connector which is capable of installing a Nano-SIM card and the mobile phone's main board is stronger for simplifying the difficulty of the circuit design of the main board in the mobile phone.

In one preferred embodiment of the TF card connector which is capable of installing a Nano-SIM card, there are eight second conducting terminals. Nano-SIM card is a new generation of SIM card in the mobile phone, which is smaller and thinner than the micro-SIM card. Based on the ETSI standard, the Nano-SIM card has to support eight kinds of circuits but not to require how to arrange the eight contact electrical pads. According to the ETSI standard, the eight second conducting terminals to allow the TF card connector which is capable of installing a Nano-SIM card to make them much more integrated with the world in order to enter the international market.

According to the above-mentioned descriptions, the invention discloses a TF card connector which is capable of installing a Nano-SIM card and a mobile phone thereof. The TF card connector is improved by arranging a Nano-SIM card connector in the TF card connector so that the functions are increased for the TF card connector. The mobile phone have the function of installing an SIM card by arranging the TF card connector capable of installing the Nano-SIM card in the mobile phone to increase the novel functions for the mobile phone such that the Nano-SIM card is used simply and conveniently after the Nano-SIM card is installed.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A TF card connector which is capable of installing a Nano-SIM card, comprising a terminal retaining base, a first card slot disposed on the terminal retaining base and adapted to a TF card, and a plurality of first conducting terminals disposed on the terminal retaining base wherein a plurality of first ends of the first conducting terminals are disposed in the first card slot for connecting to the TF card and a plurality of second ends of the first conducting terminals are disposed in one side of the terminal retaining base for connecting to a main board of the mobile phone, wherein the TF card connector further comprises:

a second card slot disposed on the terminal retaining base and adapted to a Nano-SIM card, and a plurality of second conducting terminals disposed on the terminal retaining base wherein a plurality of first ends of the second conducting terminals are disposed in the second card slot for connecting to the Nano-SIM card and a plurality of second ends of the second conducting terminals are disposed in one side of the terminal retaining base for connecting to the main board of the mobile phone wherein two sides of the second card slot and the first card slot are overlapped;

a pushing structure disposed on the terminal retaining base; and a plurality of embossment structures disposed on the terminal retaining base.

2. The TF card connector which is capable of installing the Nano-SIM card of claim 1, further comprising the Nano-SIM card identification switch disposed on the terminal retaining base for closing the Nano-SIM card identification switch when the Nano-SIM card is inserted.

3. The TF card connector which is capable of installing the Nano-SIM card of claim 1, further comprising a TF card identification switch disposed on the terminal retaining base for closing the TF card identification switch when the TF card is inserted.

4. The TF card connector which is capable of installing the Nano-SIM card of claim 1, wherein the second ends of the first conducting terminals and the second ends of the second conducting terminals are disposed respectively in the same side of the terminal retaining base.

5. The TF card connector which is capable of installing the Nano-SIM card of claim 1, wherein the second ends of the first conducting terminals and the second ends of the second conducting terminals are disposed respectively in the different sides of the terminal retaining base.

6. The TF card connector which is capable of installing the Nano-SIM card of claim 1, wherein the second card slot is opened and disposed on a bottom surface of the first card slot.

7. The TF card connector which is capable of installing the Nano-SIM card of claim 1, wherein eight second conducting terminals are disposed on the TF card connector which is capable of installing the Nano-SIM card.

8. A TF card connector which is capable of installing a Nano-SIM card, comprising a terminal retaining base, a first card slot disposed on the terminal retaining base and adapted to a TF card, and a plurality of first conducting terminals disposed on the terminal retaining base wherein a plurality of first ends of the first conducting terminals are disposed in the first card slot for connecting to the TF card and a plurality of second ends of the first conducting terminals are disposed in one side of the terminal retaining base for connecting to a main board of the mobile phone, wherein the TF card connector further comprises:
a second card slot disposed on the terminal retaining base and adapted to a Nano-SIM card, and a plurality of second conducting terminals disposed on the terminal retaining base wherein a plurality of first ends of the second conducting terminals are disposed in the second card slot for connecting to the Nano-SIM card and a plurality of second ends of the second conducting terminals are disposed in one side of the terminal retaining base for connecting to the main board of the mobile phone wherein two sides of the second card slot and the first card slot are overlapped.

9. The TF card connector which is capable of installing the Nano-SIM card of claim 8, further comprising the Nano-SIM card identification switch disposed on the terminal retaining base for closing the Nano-SIM card identification switch when the Nano-SIM card is inserted.

10. The TF card connector which is capable of installing the Nano-SIM card of claim 8, further comprising a TF card identification switch disposed on the terminal retaining base for closing the TF card identification switch when the TF card is inserted.

11. The TF card connector which is capable of installing the Nano-SIM card of claim 8, further comprising a pushing structure disposed on the terminal retaining base.

12. The TF card connector which is capable of installing the Nano-SIM card of claim 8, wherein the second ends of the first conducting terminals and the second ends of the second conducting terminals are disposed respectively in the same side of the terminal retaining base.

13. The TF card connector which is capable of installing the Nano-SIM card of claim 8, wherein the second ends of the first conducting terminals and the second ends of the second conducting terminals are disposed respectively in the different sides of the terminal retaining base.

14. The TF card connector which is capable of installing the Nano-SIM card of claim 8, wherein the second card slot is opened and disposed on a bottom surface of the first card slot.

15. The TF card connector which is capable of installing the Nano-SIM card of claim 8, wherein eight second conducting terminals are disposed on the TF card connector which is capable of installing the Nano-SIM card.

16. The TF card connector which is capable of installing the Nano-SIM card of claim 8, further comprising a plurality of embossment structures disposed on the terminal retaining base.

17. A mobile phone, comprising the TF card connector which is capable of installing the Nano-SIM card described in claim 8.

* * * * *